United States Patent [19]

Nagata

[11] Patent Number: 4,765,677

[45] Date of Patent: Aug. 23, 1988

[54] SUPPORT STRUCTURE FOR WEATHERSTRIPPING ON A VEHICLE SUN ROOF

[75] Inventor: Kazuhisa Nagata, Okazaki, Japan

[73] Assignee: Aisin Seiki Kabushiki Kaisha, Aichi, Japan

[21] Appl. No.: 912,919

[22] Filed: Sep. 29, 1986

[30] Foreign Application Priority Data

Sep. 30, 1985 [JP] Japan .................................. 60-216981

[51] Int. Cl.$^4$ ............................................... B60J 7/00
[52] U.S. Cl. ...................................... 296/216; 52/823; 49/488; 296/222
[58] Field of Search ............... 296/216, 218, 221, 222, 296/223, 224; 49/490, 491, 475, 488; 52/823, 716

[56] References Cited

U.S. PATENT DOCUMENTS 4,312,534  1/1982  Jardin et al. ..................... 296/216
4,418,956  12/1983  Yamamoto et al. ............... 296/216
4,509,791  4/1985  Bienert et al. .................... 296/216

Primary Examiner—Robert R. Song
Attorney, Agent, or Firm—Finnegan, Henderson, Farabow, Garrett & Dunner

[57] ABSTRACT

A structure for mounting a weatherstrip of a sun roof for a vehicle in which a movable lid having the weatherstrip fitted on the outer peripheral edge thereof is mounted at an opening provided in the roof in such a manner that the lid can be opened and closed as desired. The structure comprises: a projection projecting outward from the vertical wall of a flange formed in such a manner as to extend either downward or upward from the outer periphery of the movable lid; a U-shaped retaining portion formed on the weatherstrip and adapted to clamp the flange; and a projection inward from the retaining portion in opposing relation to the projection formed on the flange. Accordingly, it is possible to reliably retain the weatherstrip simply by fitting it on the flange provided along the outer periphery of the movable lid.

6 Claims, 2 Drawing Sheets

SUPPORT STRUCTURE FOR WEATHERSTRIPPING ON A VEHICLE SUN ROOF

BACKGROUND OF THE INVENTION

The present invention relates to a structure for mounting a weatherstrip of a sun roof for a vehicle in which a movable lid having the weatherstrip fitted along the outer peripheral edge thereof is mounted at an opening provided in the roof in such a manner that the lid can be opened and closed as desired.

The sun roof for a vehicle of the type described above is related to sun roofs described in the specifications of Japanese Utility Model Laid-Open No. 106718/1984 and Japanese Utility Model Publication No. 51053/1983. The conventional sun roof involves two types of movable lids, one type of lid being formed from glass, and the other being formed from a steel plate.

A movable lid which is formed from glass has a flange provided along the outer peripheral edge thereof in such a manner that the flange extends upward from the lower side of the glass for the purpose of mounting a weatherstrip. The weatherstrip has a recess for inserting the flange, and two lip portions for clamping the glass so that the weatherstrip is reliably retained by the outer periphery of the lid without any fear of the weatherstrip coming off the lid.

The conventional movable lids need to employ an adhesive for rigidly securing the glass and a panel to each other, so that it is necessary to provide a dam for preventing the adhesive from overflowing. In addition, since it is necessary to bond the weatherstrip and the glass using an adhesive, the structure is complicated disadvantageously. Further, it is difficult to assemble this type of movable lid.

The movable lid which is formed from a steel plate has a structure in which a holder is rigidly secured to the steel plate by bolts, the holder having a flange whih extends upward for the purpose of preventing the weatherstrip from coming off the lid through the repetition of the operation of opening and closing the lid.

This type of conventional movable lid needs an increased number of constituent elements, which means that the production cost is increased, and a disadvantageously long time is required for assembling.

SUMMARY OF THE INVENTION

In view of the above-described circumstances, it is an object of the present invention to provide a structure for mounting a weatherstrip of a sun roof for a vehicle which overcomes the above-described problems of the prior art.

To this end, the present invention provides a weatherstrip mounting structure which comprises: a projection projecting outward from the vertical wall of a flange provided along the outer periphery of a movable lid; a U-shaped retaining portion formed on a weatherstrip for clamping the flange; and a projection projecting inward from the retaining portion in such a manner as to oppose the projection formed on the flange.

Accordingly, the present invention enables the weatherstrip to be reliably retained without any fear of the weatherstrip coming off the movable lid simply by fitting the weatherstrip on the flange provided along the outer periphery of the lid.

It is possible, according to the present invention, to mechanically prevent the weatherstrip from moving relative to the flange of the movable lid by virtue of the projections respectively provided on the flange and the retaining portion of the weatherstrip. It is therefore possible to obtain a weatherstrip mounting structure which requires a minimized number of constituent elements, has a lowered cost and a reduced weight, and is easy to assemble.

Since the present invention has no necessity to employ an adhesive, there is no fear of the movable lid being stained with the adhesive overflowing from the area of contact between the glass and the panel, and this enables the quality to be stabilized. In addition, since there is no additional element or part, the movable lid is excellent in terms of design.

The above and other objects, features and advantages of the present invention will become more apparent from the following description of a preferred embodiment thereof, taken in conjunction with the accompanying drawings.

DESCRIPTION OF THE PREFERRED EMBODIMENT

The present invention will be described hereinunder in detail by way of the embodiment and with reference to the accompanying drawings.

Figure 1:
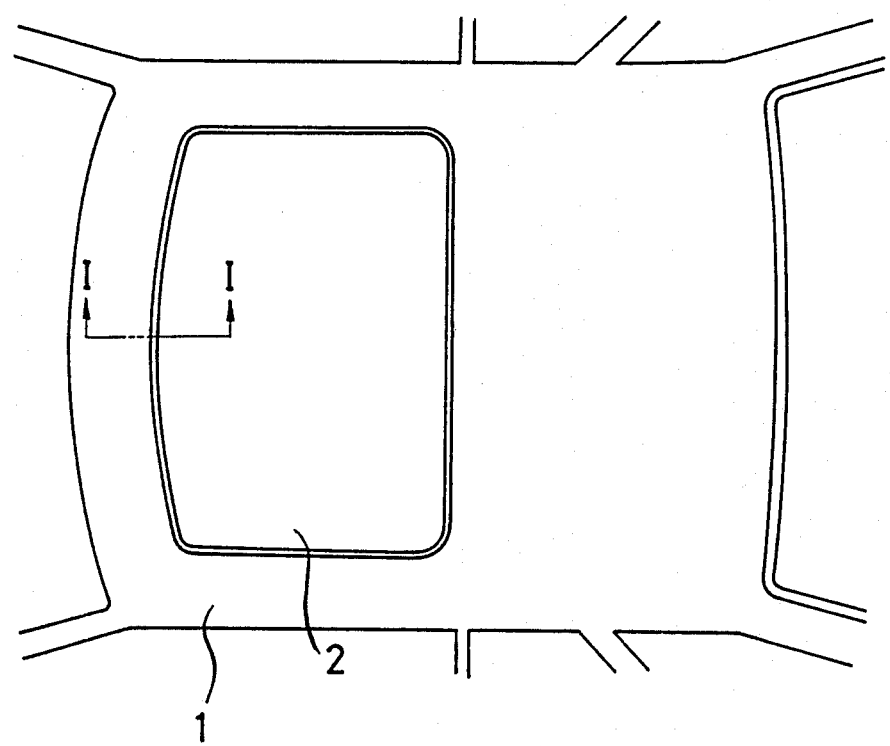
FIG. 1 is a plan view of a sun roof for a vehicle, that is, a sliding roof, to which one embodiment of the present invention is applied.
Figure 2:
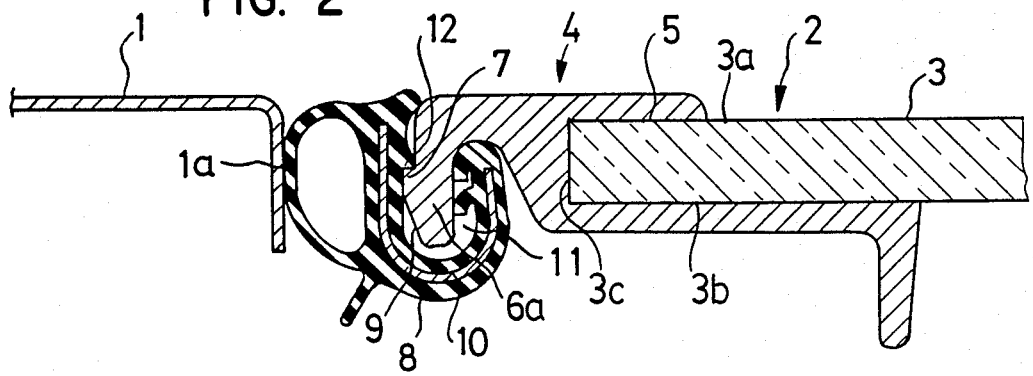
FIG. 2 is a side sectional view taken along the line I—I of FIG. 1.

Referring first to FIG. 1, a movable lid 2 is mounted at a roof opening provided fixed in a roof panel 1 of a vehicle in such a manner that the lid 2 can be opened and closed as desired Referring next to FIG. 2, the roof panel 1 has a flange 1a formed at the roof opening, the flange 1a extends downward from the edge of the opening, while a weatherstrip 8 is attached to the outer periphery of the movable lid 2. When the movable lid 2 is fitted in the roof opening in the roof panel 1, the weatherstrip 8 is in contact with the flange 1a, thereby effecting sealing between the edge of the opening in the roof panel 1 and the outer periphery of the lid 2.

The movable lid 2 consists of sliding glass roof panel 3 and a holder 4 which is made of a hard resin material. The holder 4 includes a base member 4a having an interior portion 4b which is fitted over the outer periphery of the glass 3. The glass 3 includes an outer surface 3a, an inner surface 3b, and an edge portion 3c. An adhesive is applied to an area 5 of contact between the glass 3 and the holder 4 to reliably secure them together so that water is prevented from permeating through a gap which might otherwise be present between the glass 3 and the holder 4.

As shown in FIG. 2, holder 4 has a flange 6 having an end poriton 6a extending downward from the outer periphery thereof. A projection 7 projects outwardly from the outer peripheral wall of the flange 6. The projection 7 has a slant surface 9 formed in such a manner that the degree to which it projects outward is gradually increased from the lower side toward the upper side for the purpose of facilitating the insertion of a weatherstrip 8 from the lower side.

The weatherstrip 8 has a retaining portion which is formed in a U-shape and has a recess portion 11 about which the flange 6 of the holder 4 is clamped. A core 10 is buried in the weatherstrip 8 in order to ensure the clamping of the flange 6. The U-shaped retaining portion which surrounds the recess 11 of the weatherstrip 8 has engagement means, such as a projection 12 which projects inward from a position which opposes the projection 7 on the flange 6 clamped about the recess portion 11 in such a manner that the projection 12 is engageable with the projection 7. The engagement between the projection 12 on the weatherstrip 8 and the projection 7 on the flange 6 prevents the weatherstrip 8 from coming off the flange 6 of the holder 4.

Figure 3:
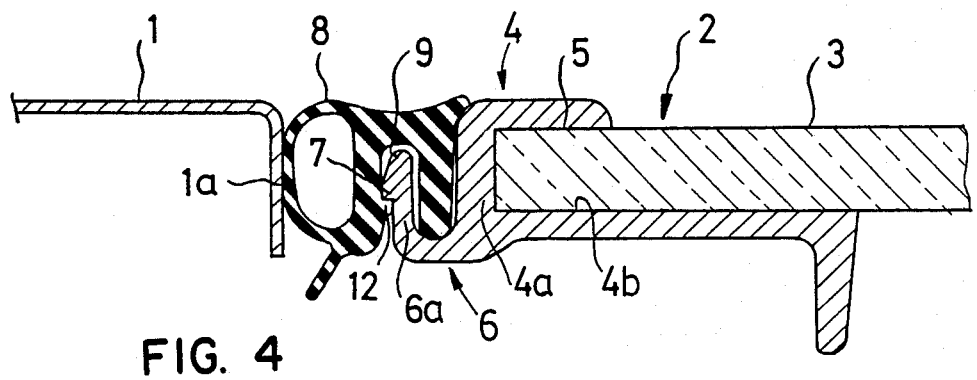
FIGS. 3 and 4 are side sectional views corresponding to FIG. 2, which respectively show modifications of the present invention.

FIG. 3 shows a modification of the weatherstrip mounting structure according to the present invention. The flange 6 is formed such as to have an outer peripheral wall which extends upward, that is, in the opposite direction to that in the case of the embodiment shown in FIG. 2. The portions corresponding to the portions in the embodiment shown in FIG. 2 are denoted by the same reference numerals, and detailed description thereof is omitted.

Figure 4:
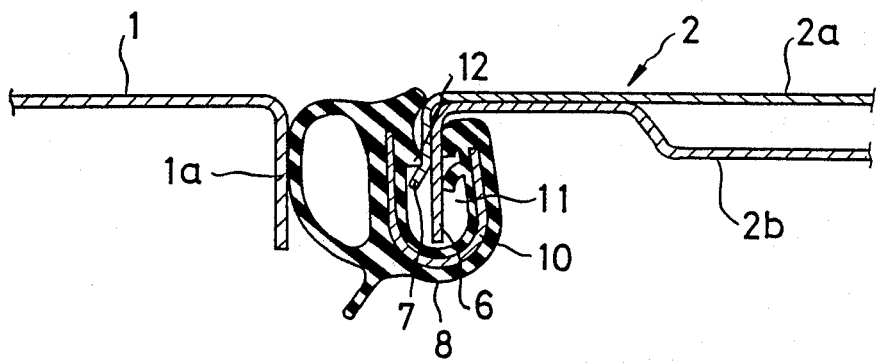

FIG. 4 shows a modification in which the movable lid 2 is formed from a steel plate. The lid 2 consists of an outer panel 2a and an inner panel 2b. A projection which corresponds to the projection 7 in each of the arrangements respectively shown in FIGS. 2 and 3 is formed on the outer panel 2a, and the wall portion of the flange 6 is defined by the inner panel 2b.

Although the present invention has been described through specific terms, it should be noted here that the described embodiment is not necessarily limiting, as various changes and modifications may be imparted thereto without departing from the scope of the invention defined by the appended claims.

What is claimed is:

1. A support structure on a vehicle sun roof, comprising:
    a roof panel adapted to be slidably mounted on a vehicle and having substantially planar outer and inner surfaces, said roof panel also including an edge portion extending between said outer and inner surfaces;
    holder means formed of hard resin material and mounted onto said roof panel, said holder means including a base member having an interior portion mated with said roof panel along said outer surface, said inner surface, and said edge portion of said roof panel, said holder means also including a flange extending from said base member and having a curved end portion spaced from said base member, said end portion having engagement means projecting in a direction away from said base member; and
    resilient weatherstripping means mounted on said flange and including a projection for engagement with said engagement means, so that said holder means securely supports said weatherstripping means along said flange.

2. The support structure defined in claim 1, wherein said weatherstripping means includes a U-shaped core member formed therein for clamping said weatherstripping means to said flange.

3. The support structure defined in claim 1, wherein said weatherstripping means includes a U-shaped retaining portion positioned about said end portion.

4. The support structure defined in claim 1, wherein said end portion includes a slant surface.

5. The support structure defined in claim 1, also including adhesive means disposed between said roof panel and said holding means for preventing fluid from collecting therebetween.

6. The support structure defined in claim 1, wherein said roof panel is glass.

* * * * *